Figure 1:
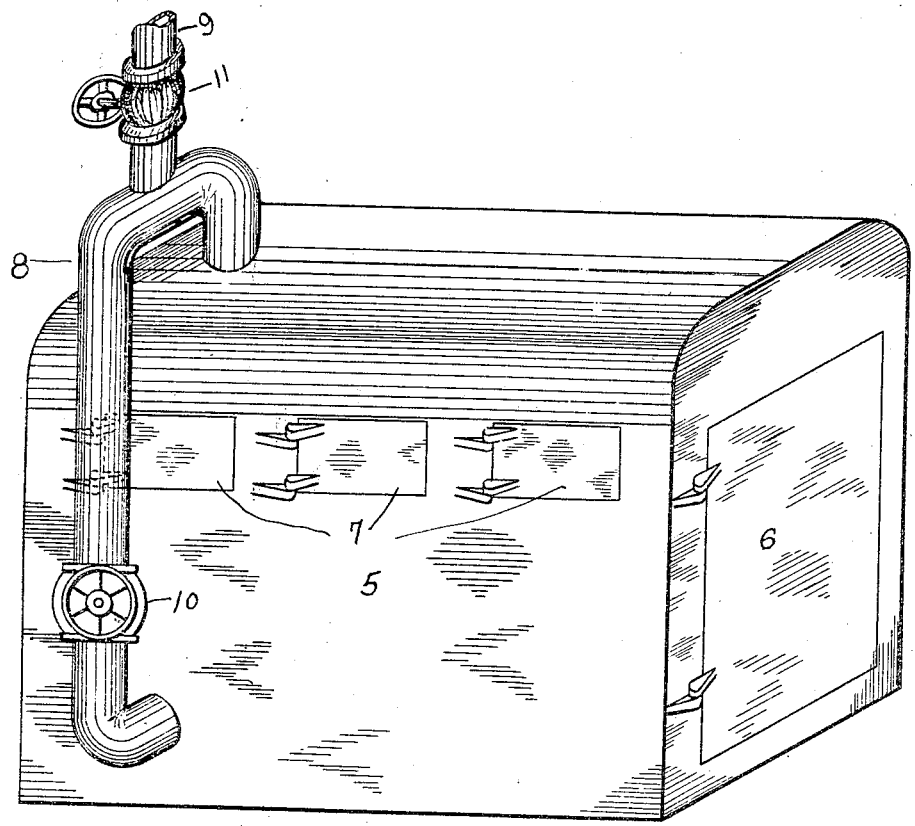

D. M. BALCH.
PROCESS OF EXPELLING VOLATILE MATTER FROM VEGETABLE PRODUCTS.
APPLICATION FILED APR. 29, 1911.

1,058,137.

Patented Apr. 8, 1913.

WITNESSES.
Frank Waterfield
C. N. Gatchel

INVENTOR.
David M. Balch
By G. E. Dorpham.
Attorney

UNITED STATES PATENT OFFICE.

DAVID M. BALCH, OF CORONADO, CALIFORNIA.

PROCESS OF EXPELLING VOLATILE MATTER FROM VEGETABLE PRODUCTS.

1,058,137.

Specification of Letters Patent.

Patented Apr. 8, 1913.

Application filed April 29, 1911. Serial No. 624,060.

*To all whom it may concern:*

Be it known that I, DAVID M. BALCH, a citizen of the United States, residing at Coronado, county of San Diego, and State of California, have invented new and useful Improvements in the Process of Expelling Volatile Matter from Vegetable Products, of which the following is a specification.

I shall describe my process as applied to *Fuci* and *Algæ*, whereby the saline and mineral constituents can be most readily separated from the organic tissues containing them.

The distillation of wood, highly perfected and widely practised, and the distillation of seaweeds, still in its infancy, are analogous operations, but their objective point is not the same. In the case of wood the condensable volatile products are of prime importance and the winning of them in good condition is the object of the process. The state of the residuum, the char, is of far less consequence since it is usually utilized as fuel in ensuing operations. In the case of seaweeds the conditions are reversed, the volatile products are now of minor importance. The state of the char determines the failure or success. A perfect char, one that will yield a lixiviate entirely free from odor or color, is indispensable to the commercially successful extraction of the saline contents of marine plants.

In dry distillation of vegetable or woody tissues, the process is fairly under way at 200 degs. centigrade. It progresses with a rising temperature, and is nearly completed at about 450 degs. C., but the char still holds about 2% of undecomposed organic matter the complete removal of which is required to produce the best results. This demands protracted exposure to a much higher temperature under the processes now in use. It is difficult to expel, even by protracted heating, from *Fuci* and *Algæ* the last portions of certain nitrogenous compounds that they contain. Moreover, protracted exposure to an elevated temperature vitiates their saline contents by reducing sulfates to sulfids and the lower oxid of sulfur. A char even when slightly imperfect has an ammoniacal and empyreumatic odor and so does the lixiviate from it, which is tinged with color and yields salts contaminated with organic products. In a patent granted to me Dec. 15th, 1903, No. 747,291, I proposed as a remedy for these difficulties, and as a means of obtaining a perfect char, the addition of a small percentage of some alkaline substance to the raw material before distillation. An alkaline earth, lime for example, would naturally be applied in a state of fine division; and would be dusted over and throughout the raw material. This gives good results under certain conditions, but is faulty in several points, especially where we treat large quantities of raw material:—

1. The introduction of foreign matter that may influence unfavorably the products sought.

2. The necessity for more or less protracted application of a temperature higher than consistent with the best results. The outer portions of the mass get overheated to their injury before the inner portions are finished.

3. A difficulty in applying the alkali so that all parts of the raw material shall be influenced by it.

4. Unnecessary expense in fuel, apparatus and loss of time.

It is the object of my present invention to obviate these defects.

Figure 2:
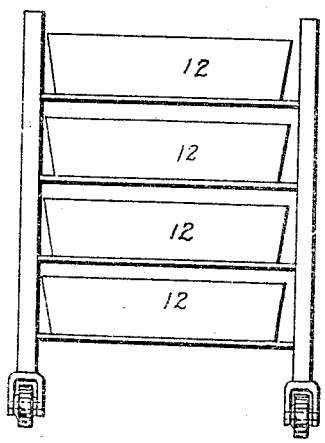

My process which I believe to be an entirely new feature in the operation of dry distillation, consists at a definite point in the process in the exposure of the contents of the retort or heating chamber to a current of air, whereby oxidation is established and the char speedily freed from volatile matter without incinerating the material, thereby simplifying and cheapening the extraction of its commercial products. I accomplish this object by the process as herein described as applied to the production of alkaline salts, chiefly potassium chlorid and sulfates from seaweeds, which I carry out by means of the apparatus described in the accompanying drawing, in which:

Figure 1, is a perspective view of a furnace for carrying out my improved process. Fig. 2, is an enlarged end view of the trays and carrier out of the furnace.

The process would be conducted as follows:—The seaweed is preferably prepared by approximate desiccation, and by division into pieces of suitable size by any suitable means, and dried. It will then be found advantageous to beat, or mechanically agitate, the material whereby a certain amount of potassium chlorid of high purity is directly separated as an effloresced salt. The material prepared as above directed is ready for the furnace, which may be of any convenient size. No specialized type of furnace is necessary; one adapted to the distillation of wood on a large scale would answer the purpose, the only innovation being the addition of a series of apertures in the side walls which are normally closed by doors. Such a furnace may consist of an oblong chamber of masonry 5, with a door 6 at one end, and apertures in the side walls which are normally closed by doors 7. Pipe 8, having a branch 9 connecting with a condensing apparatus not shown, for the collection of the volatile products, such as alcohol, ethers, light oils and other products too numerous to mention, depending on the material, leads from the top of the furnace to the ash pit. A cock 10 controls the admission of the volatile gases to the furnace. Cock 11 on branch 9 controls the conveyance of the volatile products to the condenser. Heat may be applied by means of flues or resistance coils. The material may be arranged in the heating chamber in layers not compacted but loosely shaken out; a series of trays 12 on which the material may be spread, and which can be run in and out of the chamber gives very good results, the object being to allow the heat and at the proper time the admitted air, easily to penetrate the material. The door of the heating chamber and the ventilating doors along its sides are now closed, communication with the condensing apparatus opened, and heat gradually and progressively applied. When the temperature has reached and has been maintained for some time at about 450 degs. C., and the evolution of gases and condensable hydrocarbons has nearly ceased, the temperature is slightly raised. Communication with the condensing apparatus is now shut off, the door of the chamber and its side ventilators opened, and a current of air allowed to sweep through the chamber. Superficial oxidation of the char immediately commences, which would advance to incineration if the reaction were not modified. This is accomplished by removing the trays from the heating chamber and aerating and cooling their glowing contents by brisk mechanical agitation in said trays, or, after the transference of their contents, in any suitable receptacle by any mechanical means that shall rapidly aerate, work over and cool the heated material. All volatile organic impurities are thus removed and into a minimum.

cineration of the char obviated or reduced By my process a pure char is obtained which when lixiviated gives a colorless liquid from which merchantable salts of high grade can be directly extracted without purification. As the expelling of the volatile matter is accomplished at a much lower temperature than usual there is great saving of expenditure in time, labor and fuel, the non-condensable gases, copiously evolved during the process of distillation, are utilized as fuel.

Having described my invention, what I claim is:

1. The herein described process of expelling volatile matter from vegetable products, which consists in preparing vegetable matter by comminuting the same, then placing the same in trays, then placing the trays in a suitable chamber in a furnace, then raising the temperature to about 450 degs. C., and expelling the larger part of the gases from the material without incinerating the material, and then expelling the remainder of the gases by aeration of the matter without incinerating the material, substantially as described.

2. The herein described process of expelling volatile matter from vegetable products, which consists, 1st, in subjecting dried comminuted vegetable matter contained in a closed receptacle, to the action of heat of about 450 degs. C., temperature, until the larger part of the volatile matter thereof is expelled from the receptacle without incinerating the material, and then continuing the heat and aerating the matter contained in the receptacle until volatile matter is extracted from the vegetable matter without incinerating the material.

3. The herein described process of expelling volatile matter from vegetable products, which consists 1st, in subjecting dried comminuted vegetable matter contained in a closed receptacle to the action of heat of a temperature of about 450 degs. C., until the larger part of the volatile matter thereof is evolved without incinerating the material, and then aerating the matter after removal from the receptacle until all the volatile matter is expelled without incinerating the material.

In witness that I claim the foregoing I have hereunto subscribed my name this 20th day of April, 1911.

DAVID M. BALCH.

Witnesses:
WM. HUMPHREY,
J. L. FREELAND.

Correction in Letters Patent No. 1,058,137.

It is hereby certified that in Letters Patent No. 1,058,137, granted April 8, 1913, upon the application of David M. Balch, of Coronado, California, for an improvement in "Processes of Expelling Volatile Matter from Vegetable Products," an error appears in the printed specification requiring correction as follows: Page 2, transpose lines 57 and 58; and that the said Letters Patent should be read with this correction therein that the same may conform to the record of the case in the Patent Office.

Signed and sealed this 6th day of May, A. D., 1913.

[SEAL.]

C. C. BILLINGS,
*Acting Commissioner of Patents.*